United States Patent [19]

Herrington

[11] 4,077,127

[45] Mar. 7, 1978

[54] MECHANICAL CORNER SYSTEM FOR BRICKMASONS

[76] Inventor: William Edsel Herrington, P.O. Box 26, Sumrall, Miss. 39482

[21] Appl. No.: 693,856

[22] Filed: Jun. 8, 1976

[51] Int. Cl.² ............................................. G01C 15/10
[52] U.S. Cl. ........................................................ 33/85
[58] Field of Search ........................................ 33/85, 86

[56] References Cited

U.S. PATENT DOCUMENTS

| 1,094,286 | 4/1914 | Winstead | 33/85 |
| 1,872,860 | 8/1932 | Winter | 33/85 |
| 3,114,975 | 12/1963 | Jones | 33/85 |
| 3,153,284 | 10/1964 | Harris | 33/79 R |

FOREIGN PATENT DOCUMENTS

| 819,913 | 11/1951 | Germany | 33/85 |

*Primary Examiner*—Harry N. Haroian

[57] ABSTRACT

A device to be used by brickmasons in the erection of a brick wall that embodies, speed in setting-up, precision and choice of mortar joint spacing and is adjustable to a variety of wall heights.

1 Claim, 7 Drawing Figures

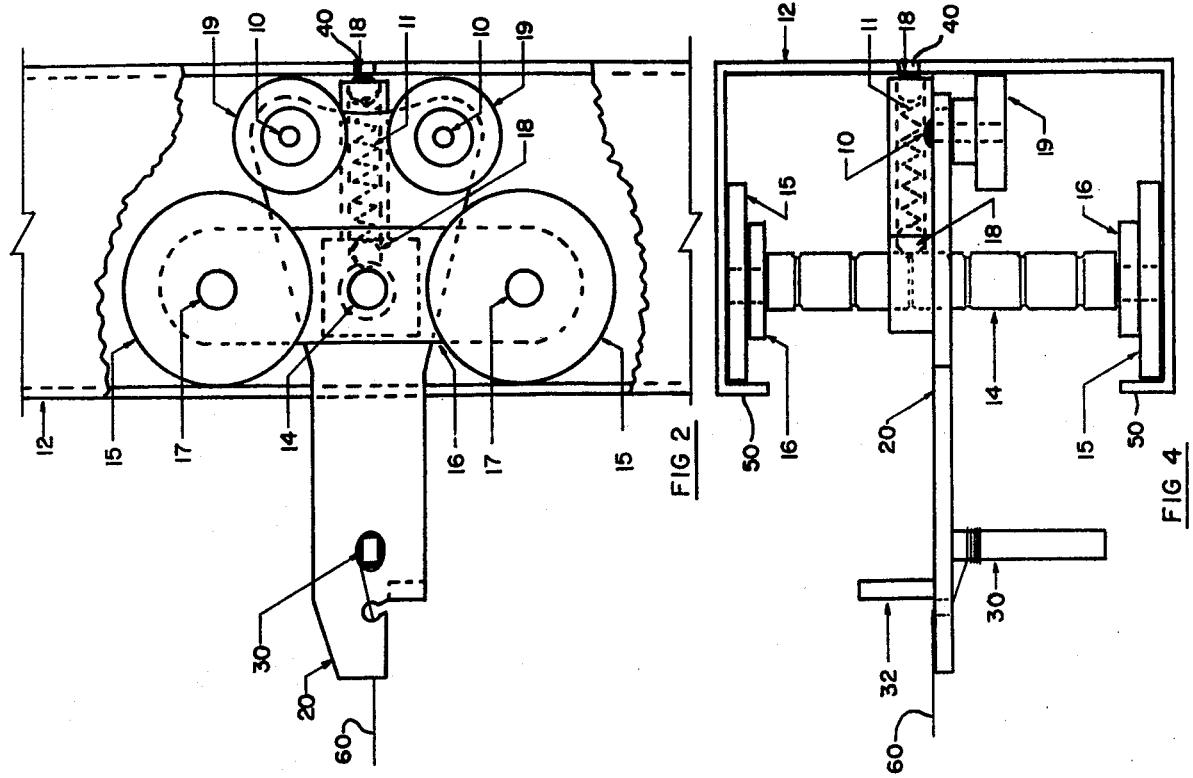
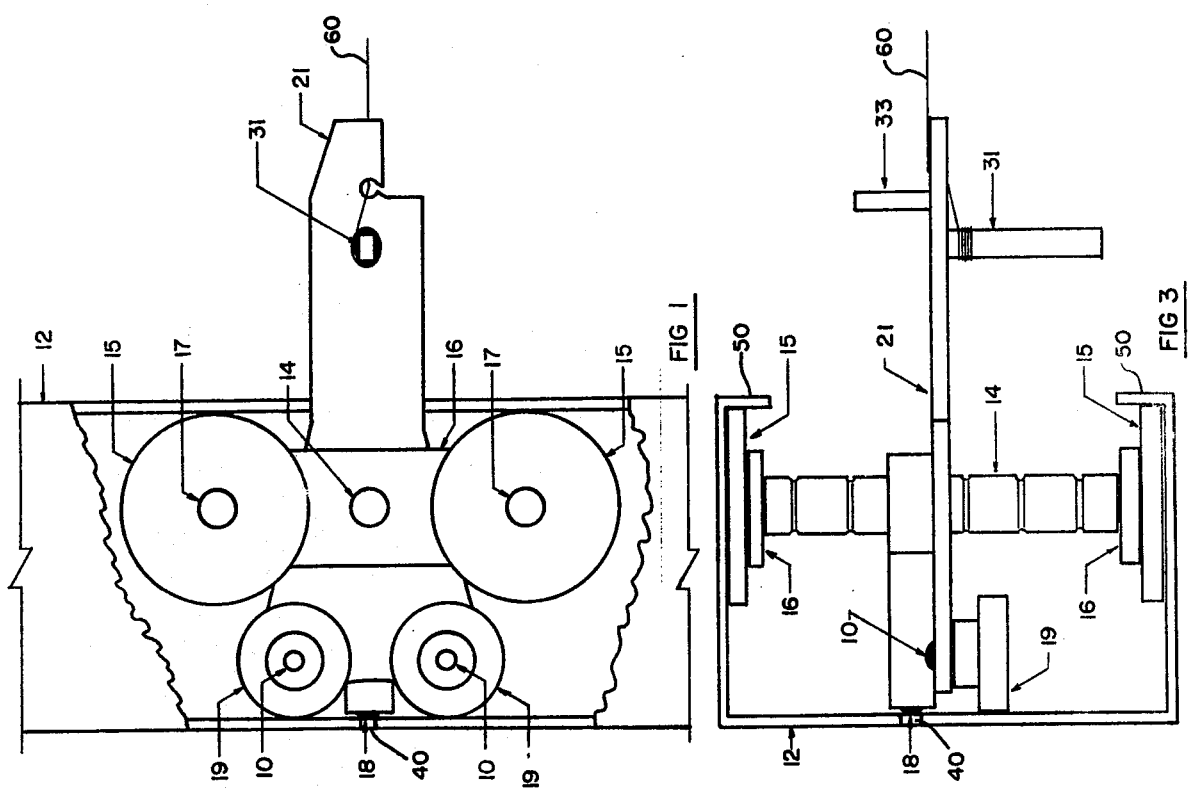

MECHANICAL CORNER SYSTEM FOR BRICKMASONS

BACKGROUND OF THE INVENTION

A precision corner system to expedite the building of a brick wall.

SUMMARY OF THE INVENTION

In the erection of a brick wall one of the most time consuming steps encountered by bricklayers is the erection of the corners upon which a line is pulled from corner to corner by which succeeding courses of brick are laid. The present invention eliminates the building of a corner with a level, or use of some other device upon which it is necessary to "lay-off" courses with some type of rule or "story-pole". It also eleminates the need for other devices for securing the mason's line to a previously built corner. It further provides the user with a choice of spacing to facilitate the selection of size of mortar joint desired, and to accomodate different sizes of brick used.

In general the present invention consists of two primary poles, one left-hand and one right-hand, which is U shaped, or, more correctly, a channel with a short return on the face side. Inside these channels are line holders mounted on rollers that are manually moved upward from course to course of brick.

The advantages and other features of the present invention will become apparent as details of construction and operation are more fully hereinafter described and claimed, reference being had to the accompaning drawings forming a part hereof, wherein like numerals refer to like parts throughout.

DESCRIPTION OF THE DRAWINGS

FIG. 1 is a side view of the left-hand line holder with a fragmentary view of the primary pole cut-away.

FIG. 2 is a side view of the right-hand line holder with concealed parts shown, also with a fragmentary view of the primary pole cut-away.

FIG. 3 is a top plan view of the left-hand line holder showing method of attaching line.

FIG. 4 is a top plan view of the right-hand line holder with concealed parts shown.

DESCRIPTION OF THE PREFERRED EMBODIMENTS

Figure 5:
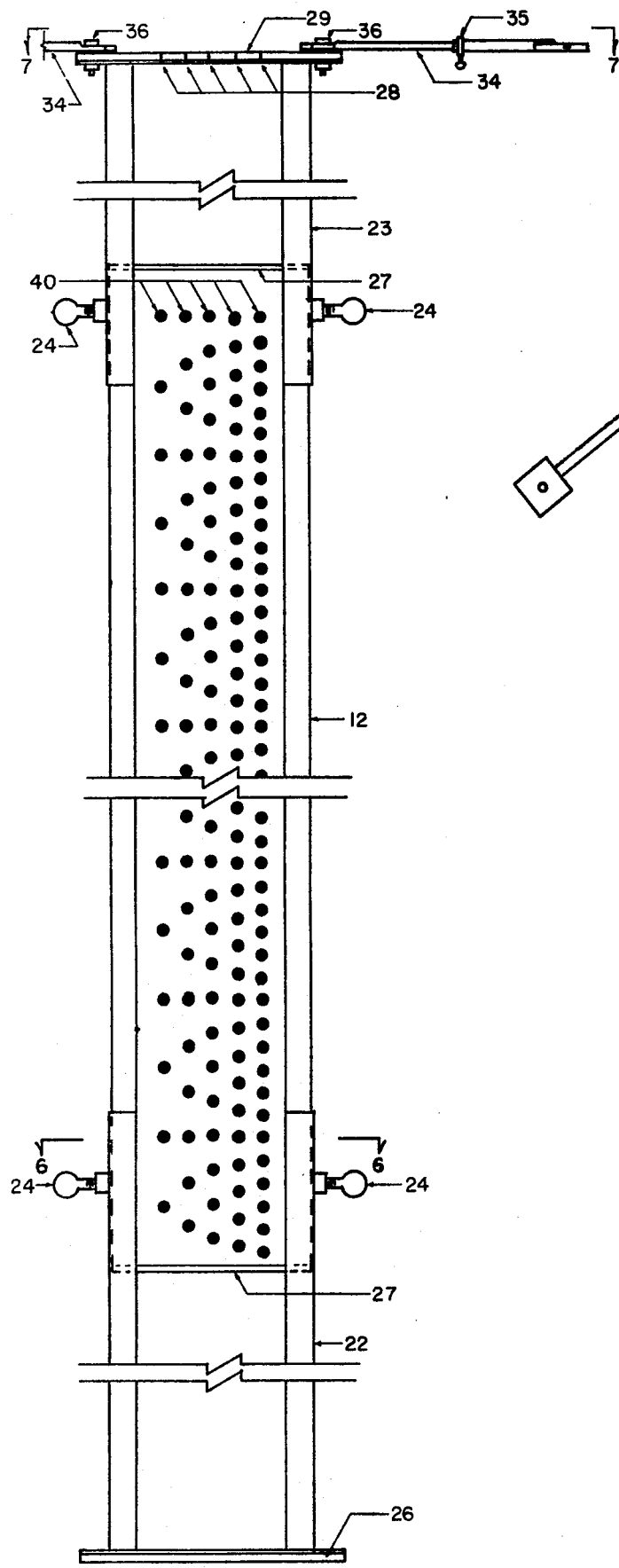
FIG. 5 is a front view of the primary pole with the top and bottom adjusting brackets.
Figure 7:
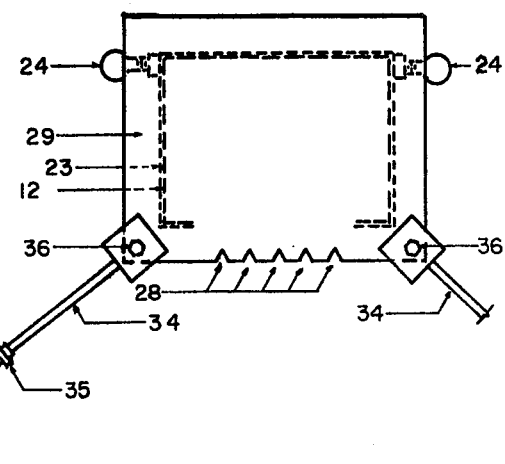
FIG. 7 is a plan view of the top adjusting bracket.
Figure 6:
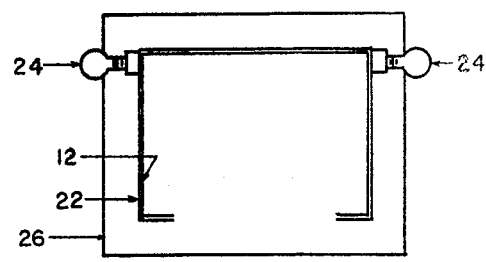
FIG. 6 is a plan view of the bottom adjusting bracket.

Numeral 12 refers to the left-hand primary pole. The right-hand primary pole is identical to the left-hand except that holes 40 are opposite or reversed. Primary pole 12 is a length of metal bent or formed as a channel of sufficient depth and width to accomodate assemblies of FIGS. 1 and 2 hereinafter described, and each channel member having short flanges 50 inturned on each side of the face of each channel member. Numeral 40 is illustrative only to show vertical rows of holes which are drilled or punched selectively in the back side of said primary pole 12 to correspond to choice of either standard or modular brick spacings. Numeral 27 is a retainer plate fitted and secured inside of said primary pole at top and bottom to prevent line holder assemblies of FIGS. 1 and 2 from being disengaged from primary pole 12. Numeral 22 refers to the bottom adjusting bracket which is a length of metal bent or formed to fit over or outside of primary pole 12, to the bottom of said adjusting bracket 22 is attached base plate 26. Numeral 24 refers to the thumb screws of both bottom adjusting bracket 22 and top adjusting bracket 23, their purpose being to achieve rigidity and securing of primary pole 12 after assembly is plumbed in place. Numeral 23 refers to the top adjusting bracket which is a length of metal bent or formed to fit over or outside of primary pole 12. To tthe top of said top adjusting bracket 23 is attached top plate 29. Numeral 28 refers to notches in plate29 corresponding, in a plane to the vertical rows of holes 40 of primary pole 12 their purpose being to facilitate alignment of assembly to pre-determined face point of finished wall. Numeral 34 refers to adjustable arms provided when it is necessary to secure top of primary pole 12 to sides of previouslybuilt frame or masonry wall where a flat surface such as a soffit is not available. Numeral 36 refers to screw for attaching adjustable arm34 to top plate 29. Numeral 35 refers to thumb screws of adjustable arms 34 to secure assembly after adjustment is made. The above described top adjusting bracket 23 and bottom adjusting bracket 22 are provided to accomodate the varying heights of brick wall to be erected. Numeral 20 refers to the right-hand line holder plate being either shaped or molded with the center-rear being of sufficient thickness to facilitate the drilling of hole to receive spring 11. Numeral 30 refers to a pin which is attached to line holder plate 20 and is projected to the right of said line holder plate 20 for the purpose of attaching mason's line 60. Numeral 32 refers to a brick stop which is attached to, or an intergal of line holder plate 20. Said brick stop 32 provides the plumb point where brick wall corners. Numeral 14 refers to a shaft with circumferential grooves corresponding to holes 40 of primary pole 12 upon which line holder plate 20 is movable horizontally for the purpose of selecting coursing of brick as desired. Numeral 16 refers to roller mounting plate which is attached or fitted to each end of shaft 14. Numeral 15 refers to rollers attached to roller mounting plate 16 by means of shoulder studs 17. Numeral 19 refers to stabilizer rollers mounted to the rear of line holder plate 20 with screws 10 through slightly elongated holes to provide adjustment to prevent rollers 15 and 19 from binding each other. Said rollers 19 also prevent up and down play of line holder plate 20. Numeral 18 refers to balls or pins with rounded ends which is received by hole 40 of primary pole 12 and circumferential groove of shaft 14. Numeral 11 refers to compression type spring which exerts pressure on balls or pins 18 to hold line holder assembly in selected position. Numeral 21 refers to the left-hand line holder plate and is identical to the right-hand line holder plate 20 described above except pin 31 is projected to the left and brick stop 33 is projected to the right.

In use, the top of primary pole 12 is aligned to the top course of brick required to finish wall under construction. Notch 28 of plate 29 of selected course spacing is aligned to the inside of frieze board or facia board or other pre-determined finish point of said wall under construction. Brick stop 32 is aligned to the turning point of wall corner. Said primary pole 12 is then plumbed and secured in place by means of said adjusting brackets 22 and 23. Line holders 20 and 21 are moved horizontally on shaft 14 to correspond to selected course spacing and positioned vertically at desired starting point. After brick are laid, mortar joints at the corners are free of any obstruction to accomodate tooling of said mortar joints.

I claim as new:
1. A mechanical corner system comprising: A pair, left and right, of vertically elongated channel members used as primary poles each of said channel members having short flanges inturned on each side of the face thereof, said channel members each having a plurality of vertical rows of holes in the back walls of said channel members each row of said vertical rows of holes corresponding, center to center, to selected brick course spacing, said vertical rows of holes being left to right in one channel members and right to left in opposing channel members, said channels having lower adjusting brackets attached to each channel members at the lower end, and upper adjusting brackets attached to each channel members at the upper end, said upper adjusting brackets having grooves in the front edge of top plate of said upper adjusting brackets, said grooves corresponding to each row of said vertical rows of holes of said channel members, said upper adjusting brackets having adjustable arms attached and extended from the front edge of said top plate of said upper adjusting brackets for attachment to a previously built wall, a pair, left and right, of line holding members, said means including a shaft having circumferential grooves therein corresponding to the vertical rows of holes in said channel members, said shaft having roller means thereon for engaging said short inturned flanges and said line holding members having a rear portion mounting roller means for engaging the rear wall of the channel member, said line holding members including means for movably mounting same along said shaft and said rear portion also carrying spring pressed pin means for engaging a selected one of said holes in said channel members and a corresponding groove in said shaft.

* * * * *